Feb. 14, 1939.　　　T. N. PIERSON　　　2,147,267
HARVESTER FRAME
Filed Dec. 30, 1937　　　3 Sheets-Sheet 2
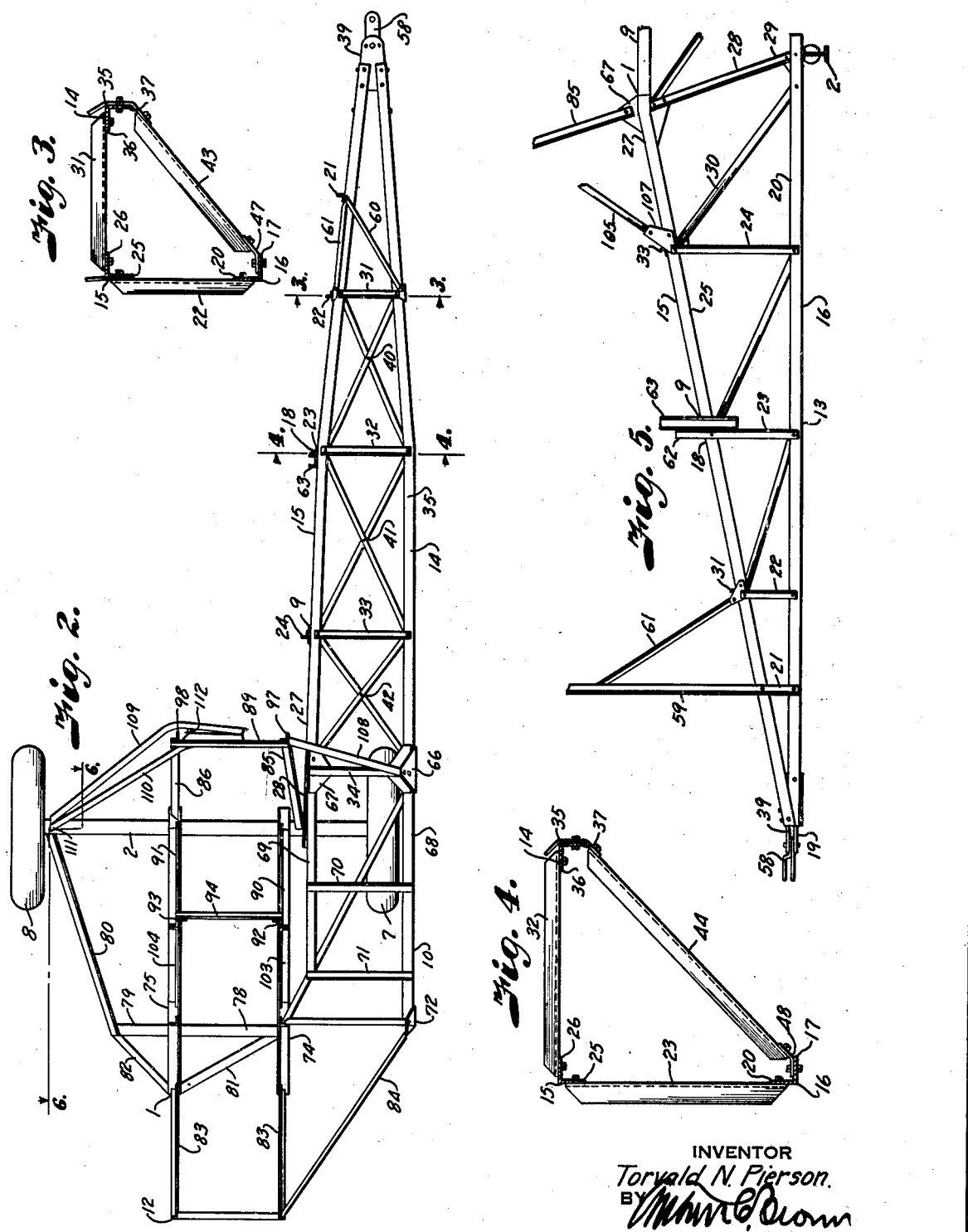
INVENTOR
Torvald N. Pierson.
BY
ATTORNEY

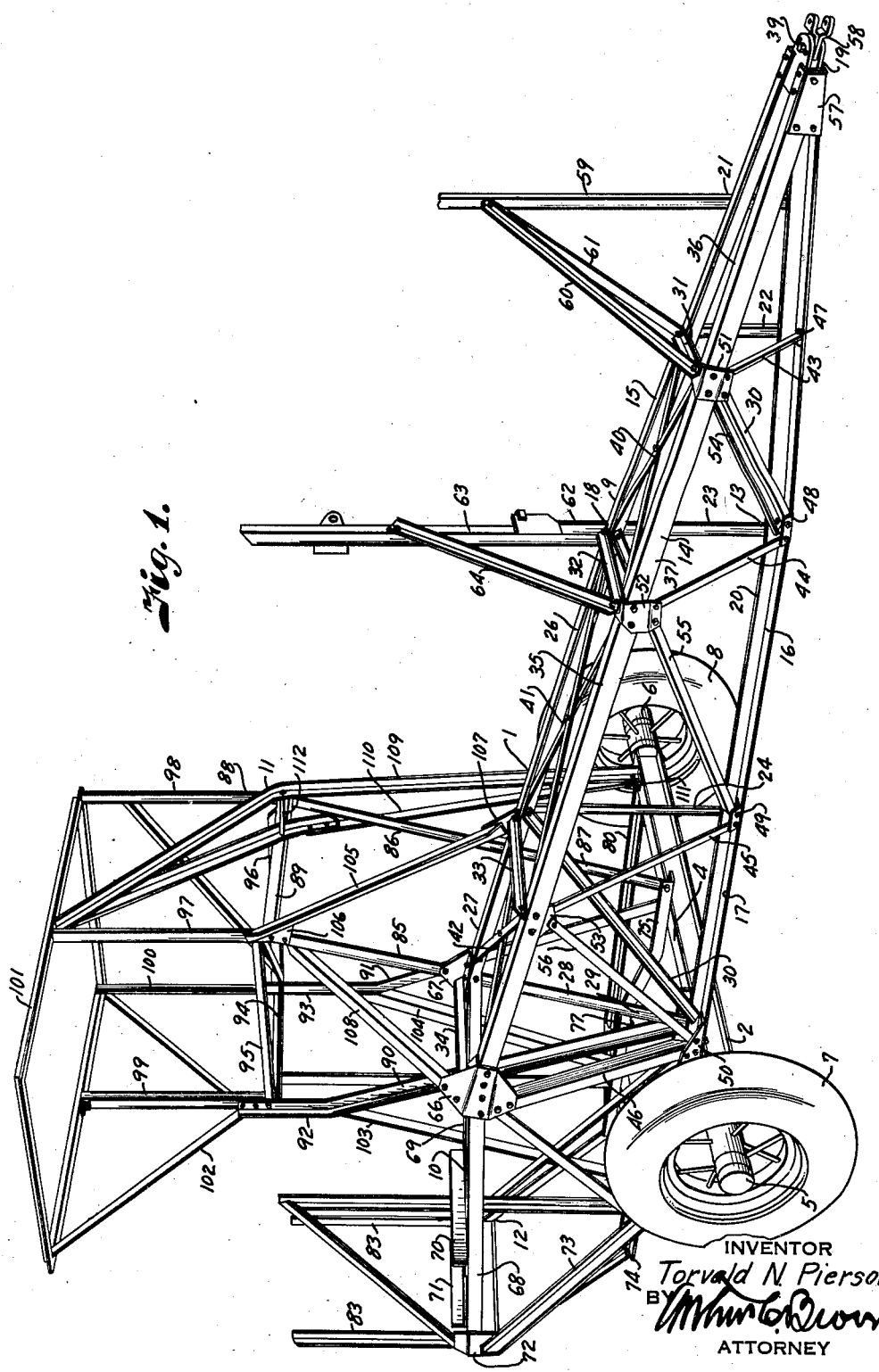

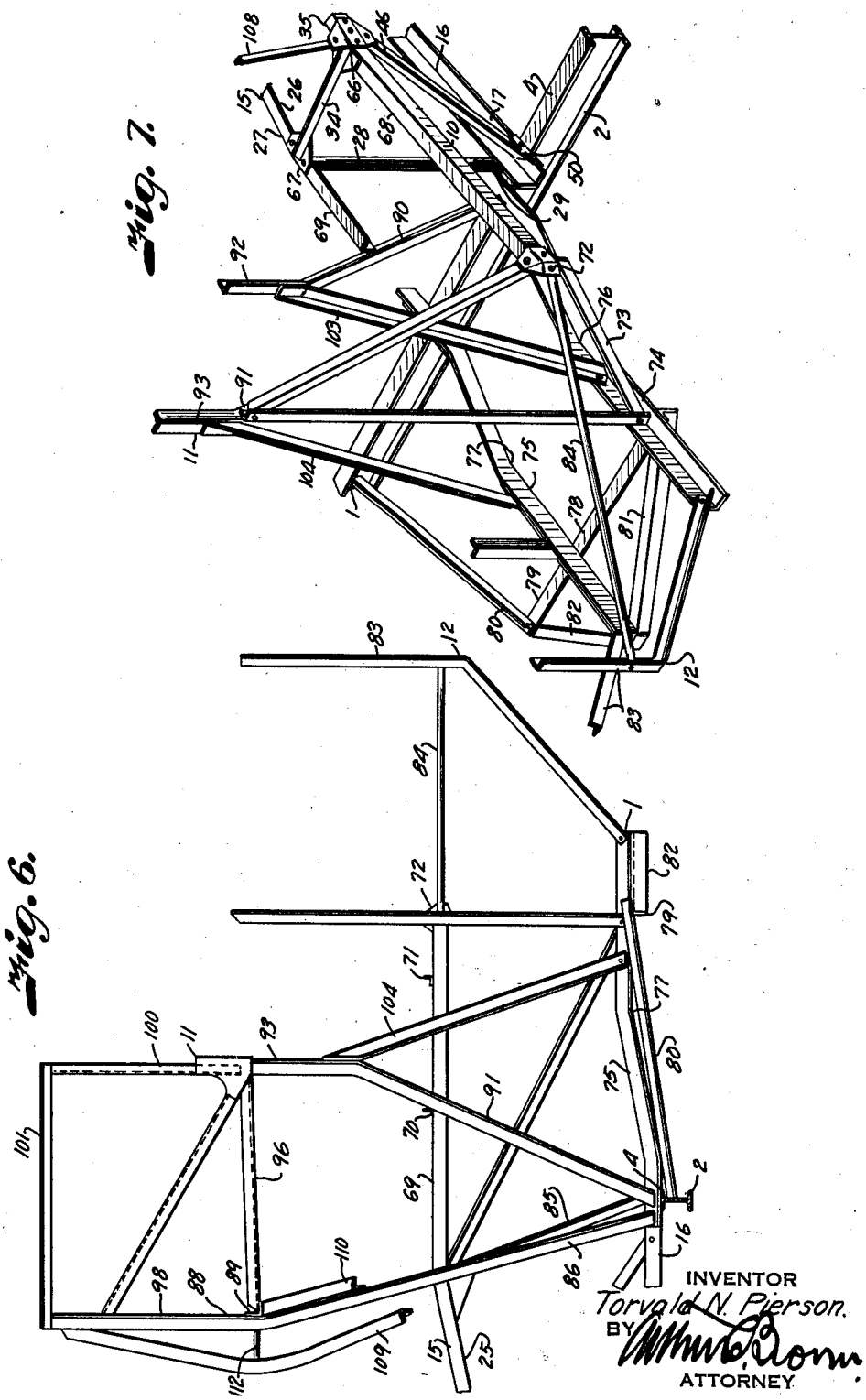

Patented Feb. 14, 1939

2,147,267

UNITED STATES PATENT OFFICE 2,147,267

HARVESTER FRAME

Torvald N. Pierson, Independence, Mo., assignor to Gleaner Harvester Corporation, Independence, Mo., a corporation of Delaware Application December 30, 1937, Serial No. 182,485

12 Claims. (Cl. 56—20)

This invention relates to harvesting machines and particularly to those known as combines for harvesting, threshing and separating grain and similar field crops. Heretofore machines of this character were constructed for extensive farm operations in the great plains country and such machines have not been suitable for use on farms wherein the fields are small and of irregular terrain. Owing to the superiority and convenience of harvesting grains by combine method, harvester manufacturers have turned their attention to small size machines which may be sold economically to the small farmer, however, it has been difficult to build a small sized machine that is commercially practicable.

It is, therefore, the principal object of the present invention to provide a machine of this character adapted for use of the small farmer in that it is readily portable and has an extremely high weight strength ratio so that it may be successfully operated in small fields.

Other important objects of the invention are to provide a frame for small combine harvesters that is of extremely rigid construction; to provide a frame wherein the draft tongue constitutes the major portion of the frame and which is constructed to withstand vertical, transverse and torsional thrusts imparted incidental to movement of the machine by a draft vehicle; to provide a frame wherein the axle and grain wheels are kept in rigid, angular relation with respect to the line of draft; to provide a supporting frame wherein the major loads and thrusts are carried directly above the supporting axle; to provide a truss-work that extends around the rear of the separator housing to maintain rigidity of the axle relatively to the supporting tongue; and to provide a vertical frame extension for rigidly supporting the grain bin.

In accomplishing these and other objects of the invention, as hereinafter pointed out, I have provided improved details of structure, the preferred form of which is illustrated in the accompanying drawings, wherein:

Fig. 1 is a perspective view of a harvester frame especially designed for small combines, the separator and thresher housings, grain pan and grain bin being removed to better illustrate the frame structure.

Fig. 2 is a plan view of the frame as shown in Fig. 1.

Fig. 3 is a cross-section through the truss-like tongue on the line 3—3 of Fig. 2.

Fig. 4 is a similar cross-section on the line 4—4 of Fig. 2.

Fig. 5 is an elevational view of the truss-like tongue on the side opposite that illustrated in Fig. 1.

Fig. 6 is a longitudinal section through a portion of the frame taken on the line 6—6 of Fig. 2.

Fig. 7 is a detail perspective view of the rear portion of the frame, the ends of the axle and upper portion of the frame being broken away.

Referring more in detail to the drawings:

1 designates a harvester frame constructed in accordance with the present invention and which is supported at the rear on a transverse axle 2 and at the front by the draw bar of a tractor or other draft vehicle. The axle 2 is shown in the present drawings as being an I-beam member having an upper flange 4 on which the frame 1 is supported, as later described. The ends of the axle 2 carry spindles 5 and 6 on which ground wheels 7 and 8 are rotatably mounted.

The frame 1 includes a tongue or draft section 9, a motor supporting section 10, a grain bin supporting section 11 and a separating and threshing housing supporting section 12, all formed of structural members preferably of angle cross-section. The rear end of the tongue or draft section 9 is supported upon the flange 4 of the axle 2 at a point adjacent the inner side of the ground wheel 7 in order to provide sufficient room on the axle for the harvester and separator housing (not shown). The line of draft, therefore, is offset laterally from the longitudinal center line between the ground wheels so that when the machine is drawn by the draft vehicle there is considerable side draft and unless the supporting frame is rigidly constructed and braced there is a tendency for the ground wheel 8 to lag behind the wheel 7. The supporting frame, is, therefore, constructed so that torsional tendencies due to the side draft are eliminated and the harvesting machine will follow the draft vehicle in a direct course down a swath of grain being cut while the draft vehicle is moving in a previously cut swath.

It is the purpose of the present invention to construct the tongue or draft section 9 so that it forms the major supporting framework of the harvesting machine and all lateral and torsional stresses are taken by the tongue section including the load of the harvesting, threshing, separating and grain bin units. The tongue or draft section is, therefore, built in the form of a vertical truss 13 to withstand torsional strains imparted in a vertical direction incidental to the supported load and a laterally extending horizontal truss 14 cooperating with the upper chord 15 of the vertical truss to resist torsional strains acting incidental to side draft and guiding of the machine, the latter truss being spaced from the lower member of the vertical truss to resist sway and internal torsional strains imparted in the tongue or draft section incidental to the irregular terrain over which the machine must be drawn, including shifting of the center of gravity caused by inclination of the grain bin and harvesting units when the machine is drawn over laterally sloping fields. The lower chord member 16 of the vertical truss is shown as comprising an angle member having one flange 17 thereof positioned horizontally with its rear end resting upon and rigidly attached to the upper flange 4 of the supporting axle 2. The forward end of the chord extends at a slightly obtuse angle for substantially half its length from which point 18 the member extends at a slightly greater angle so that the forward end thereof terminates in a vertical plane substantially aligning with the inner side face of the ground wheel 7, as best shown in Fig. 2, where it connects with a clevis plate 19. Attached to the vertical flange 20 of the lower chord, at spaced points along the length thereof, are struts 21, 22, 23 and 24 to connect with the vertical flange 25 of the upper chord. The other flange 26 of the upper chord thus lies in the same vertical plane as the flange 17 of the lower chord. The rear end 27 of the upper chord is connected with a strut 28 which has its lower end 29 attached over the axle to the lower strut and extends upwardly at a forward angle to connect with the rear end of the upper chord. The attaching points of the upper chord to the struts 28 and 21 to 24 are such that the chord converges toward the lower chord and the vertical flange 25 thereof connects with the forward end of the vertical flange 20 of the lower chord. Rigidity is imparted to the truss by diagonals 30 that connect with the vertical flange adjacent the attaching points of the lower ends of the vertical struts and extend forwardly to connect with the vertical flange of the upper chord adjacent the attaching points of the upper ends of the struts, as best shown in Fig. 5.

Connected with the horizontal flange 26 at points aligning with the vertical struts are laterally extending members 31, 32, 33 and 34 of the horizontal truss to connect at their outer ends with an outer chord comprising an angle member 35 having its horizontal flange 36 arranged in the plane of the horizontal flange 26 and its vertical flange 37 directed downwardly, as best shown in Fig. 1. The lateral member 34 at the rear end of the truss is of sufficient length so that the rear end of the chord 35 projects over and beyond the outer side of the grain wheel 7, as best shown in Fig. 2, from where the chord extends forwardly in substantially parallel relation with the chord 15 to the point 18 thereof where the angle of the chord changes to connect with the forward end of the chord 15 by means of an upper clevis plate 39, the clevis plate 39 being secured to the facing horizontal flanges of the respective chords 35 and 15, as best shown in Figs. 1 and 2.

The bays between the lateral members 31, 32, 33 and 34 are provided with cross braces 40, 41, and 42 respectively to resist any rack or sway between the respective chords 35 and 15 that is imparted incidental to side draft on the machine. The outer chord 35 of the horizontal truss is braced from the lower chord of the vertical truss by inclined struts 43, 44, 45 and 46 that have their lower ends connected with angle clips 47, 48, 49 and 50 attached to the horizontal flange 17 of the lower chord, as best shown in Fig. 1. The angle clips are also connected with gusset plates 51, 52, and 53 carried by the vertical flange 37 of the chord 35 by forwardly and upwardly extending brace bars 54, 55 and 56 to cooperate with the brace bars 30 to impart rigidity to the truss members in a fore and aft direction. The rear brace 46 is of heavier material than the braces 43, 44 and 45, as this member cooperates with the strut 28 to carry the load of the motor supporting section 10, previously mentioned. The forward end of the chord 35 is connected with the corresponding end of the lower chord 16 by an angle shaped gusset 57 to maintain parallel relation of the clevis plates 19 and 39 for pivotally supporting a clevis 58 by which the tongue section is connected with the draft bar of the tractor 3. The strut 21 is of sufficient length to form a supporting post 59 for the grain pan elevating shaft (not shown), the post 59 being braced from the horizontal truss by bars 60 and 61. Attached to the upwardly projecting end 62 of the truss 23 is a channel-shaped upright 63 for carrying the rack bar of the grain pan elevating mechanism (not shown). The upright 63 is braced perpendicularly by brace bars 64.

Secured to the rear ends of the chords 35 and 15 are gusset plates 66 and 67 that connect the forward ends of horizontally positioned angle bars 68 and 69 that form continuations of the horizontal truss and which extend rearwardly a sufficient distance to accommodate the supporting framework 10 for the motor unit (not shown), the motor unit being carried on the angles 68 and 69 by transverse angles 70 and 71 that also retain the angles 68 and 69 in their proper spaced relation. The rear end of the angle 68 carries a gusset plate 72 for connecting a brace bar 73 that projects upwardly and outwardly from a rearwardly extending angle member 74, having its forward end attached to the flange 4 of the axle 2 in inwardly spaced relation with the lower chord 16 and which cooperates with a similarly extending inwardly spaced angle bar 75 to form the lower supporting frame of the threshing and separating units of the machine (not shown). The members 74 and 75 have their rear ends offset upwardly, as at 76 and 77, so that the rear ends thereof are carried above the level of the axle, the upper offset portions of the bars being connected by an angle-shaped cross bar 78 that is spaced forwardly from the rear ends thereof and which has its inner end 79 projecting beyond the angle member 75 to connect with the outer end of the axle 2 at a point adjacent the inner end of the ground wheel 8 by an angle-shaped tie bar 80 whereby that end of the axle is supported in right angular relation to the center of the draft of the tongue portion of the frame, and whereby the ground wheel 8 is kept in aligned relation with the ground wheel 7. In order to further enhance the rigidity of the axle the respective ends of the member 78 are braced from the rear end of the member 76 by means of angle-shaped brace bars 81 and 82, the brace bars thus cooperating with the members 78 to form a substantially triangular-shaped truss extending transversely of the machine imparting rigidity to the axle. It is thus obvious that the axle is rigidly braced from the rear side thereof and that the bracing structure will be carried around the rear end of the separator housing, leaving the space in front of the axle entirely open for accommodating the harvesting unit of the machine (not shown). By providing the transverse trussing around the rear of the housing, it is obvious that the separator and thresher housing is entirely free of any torsional strains imparted to side draft on the ground wheels.

Extending rearwardly from the terminal ends of the angle members 74 and 75 are upwardly and rearwardly extending angles 83 for supporting the rear end of the separator housing. The outer end of the brace 83 is connected with the gusset plate 72 by means of a tie bar 84 as best shown in Fig. 7, to cooperate with the transverse angles 70, 71 and 34 in imparting rigidity to the motor supporting portion of the frame.

Attached to the gusset plate 67 and extending upwardly therefrom in a vertical plane but substantially at the same forward angle as the strut 28, is an angle member 85 which cooperates with a similar angle 86 having its lower end 87 connected with the forward end of the angle member 75 and its upper end 88 connected by a cross bar 89 with the upper end of the bar 85 to form part of the supporting structure of the grain bin supporting portion 11 of the frame. Connected with the forward ends of the angle members 74 and 75 are upwardly and rearwardly extending angle bars 90 and 91 terminating in vertical portions 92 and 93 that are interconnected by a cross bar 94 and located in horizontal alignment with the bar 89, previously described. The terminal ends 92 and 93 are also connected with the ends of the bars 85 and 86 by angle bars 95 and 96 forming a framework on which the bottom of the grain bin (not shown) is adapted to be supported.

Extending upwardly from the terminal ends of the supporting bars 85—86 and 92—93 are vertical posts 97, 98, 99 and 100 respectively, which carry an upper angle iron girth 101 that is adapted to extend around the upper portion of the bin. The girth 101 projects outwardly from the posts 97 and 99 but is braced therefrom by a bar 102. The bin supporting frame thus described is braced in an aft direction by angle bars 103 and 104 that connect the angle bars 90 and 91 with the horizontal angle bars 74 and 75, as best shown in Fig. 7. The grain bin supporting frame is braced in a forward direction by an angle iron brace 105 that is connected by a gusset plate 106 with the angle member 85 and with the upper chord 15 by a gusset plate 107, as best shown in Fig. 1. The structure is also braced in the direction of the outer ground wheel 7 by an angle bar 108 that connects the gusset plate 66 with the supporting bar 85. The opposite supporting bar 86 is braced from the outer end of the axle 2 by means of truss bars 109 and 110 having their upper ends connected with the upper end of the post 97 and the lower ends with an angle clip 111 that is attached to the upper flange of the axle. The angle bars 109 and 110 are spread apart to form a truss by means of a rod 112 that extends through one of the flanges of the forward member and through an aligning flange of the other member at the point where it crosses the bar 89, as best shown in Fig. 1. It is thus obvious that the grain bin supporting portion of the frame is adequately braced in all directions relatively to the axle and the truss-like tongue portion of the frame.

A harvester frame constructed and assembled as described is of very rigid construction and has a relatively high strength weight ratio so that the completed machine is of relatively light weight yet of sufficient strength to withstand the stresses encountered in actual operation of the machine.

What I claim and desire to secure by Letters Patent is:

1. A combine harvester frame including an axle, wheels supporting the ends of the axle, a separator carrying section mounted on the axle, a grain bin supporting section including upright members connected with the separator section and extending upwardly therefrom to carry a grain bin above the separator section, a draft tongue including a truss having a lower chord connected with the axle and an upper chord having connection with the grain bin supporting section at a point spaced above the axle to stabilize the grain bin section, a lateral truss including said upper chord and a chord spaced outwardly therefrom, struts and diagonals connecting the chords of the respective trusses, and brace means connecting the outer chord of the lateral truss with the grain bin section at a point above the connection of said upper chord.

2. A combine harvester frame including an axle, wheels supporting the ends of the axle, a separator carrying section mounted at one end of the axle, a grain bin supporting section including upright members extending upwardly from the separator section to carry a grain bin above the separator section, a draft tongue including a truss having a lower chord connected with the axle and an upper chord having connection with the grain bin section at a point spaced above the axle, a lateral truss including said upper chord and a chord spaced outwardly therefrom, struts and diagonals connecting the chords of the respective trusses, means connecting the outer chord of the lateral truss with the grain bin section at a point above the connection of said upper chord, and a truss connecting the upper portion of the grain bin section with the opposite end of the axle.

3. A combine harvester frame including an axle, wheels supporting the ends of the axle, a separator carrying section mounted on the axle, a grain bin supporting section including upright members extending upwardly from the separator section to carry a grain bin above the separator section, a draft tongue including a truss having a lower chord connected with the axle, an upper chord having connection with the grain bin section at a point spaced above the axle, a lateral truss including said upper chord and a chord spaced outwardly therefrom, struts and diagonals connecting the chords of the respective trusses, a member bracing the outer chord of the lateral truss with the grain bin section at a point above the connection of said upper chord, and a torsion resisting brace member connecting said lower chord with an upper portion of the grain bin supporting section at a point spaced from said connection of the first brace member whereby said brace members cooperate with said trusses to resist torsional stresses tending to twist the grain bin supporting section of the frame.

4. A combine harvester frame including an axle, wheels supporting the ends of the axle, a separator carrying section mounted at one end of the axle, a grain bin supporting section including upright members extending above the separator section to carry a grain bin above the separator section, a draft tongue including a truss having a lower chord connected with the axle and an upper chord having connection with the grain bin at a point spaced above the axle, a lateral truss including said upper chord and a chord spaced outwardly therefrom, struts and diagonals connecting the chords of the respective trusses, a member bracing the outer chord of the lateral truss with the grain bin section at a point above the connection of said upper chord, a torsion resisting brace member connecting said lower chord with an upper portion of the grain bin supporting section at a point spaced from said connection of the first brace member whereby said brace members cooperate with said trusses to resist torsional stresses tending to twist the grain bin supporting section, and a truss connecting the upper portion of the grain bin section with the opposite end of the axle.

5. A combine harvester frame including an axle, wheels supporting the ends of the axle, a separator carrying section mounted on the axle, a grain bin supporting section including upright members for carrying a grain bin above the separator section, a draft tongue including a truss having a lower chord connected with one end of the axle and an upper chord having connection with the grain bin section at a point spaced above the axle, a lateral truss including said upper chord and a chord spaced outwardly therefrom, said trusses including struts and diagonals connecting said chords, brace means connecting the grain bin section with each of said chords, a motor support comprising a rearward extension of said upper and lateral chords, and truss means connecting said motor support with the opposite end of the axle.

6. A combine harvester frame including an axle, wheels supporting the ends of the axle, a separator carrying section mounted on the axle, a grain bin supporting section including upright members for carrying a grain bin above the separator section, a draft tongue including a truss having a lower chord connected with one end of the axle and an upper chord having connection with the grain bin section at a point spaced above the axle, a lateral truss including said upper chord and a chord spaced outwardly therefrom, said trusses including struts and diagonals connecting said chords, bracing means connecting the grain bin section with said chords, a truss connecting the upper portion of the grain bin section with the opposite end of the axle, a motor support comprising a rearward extension of said lateral truss, and truss means connecting said motor support with said opposite end of the axle.

7. A combine harvester frame including an axle, wheels suporting the ends of the axle, a separator carrying section mounted on the axle, a grain bin supporting section extending above the separator section for carrying a grain bin above the separator section, a draft tongue including a truss having a lower chord connected with one end of the axle and an upper chord having connection with the grain bin section at a point spaced above the axle, a lateral truss including said upper chord and an outer chord spaced outwardly therefrom, means connecting the respective chords, brace means connecting the outer chord of the lateral truss with the grain bin section at a point above the connection of said upper chord, a torsion resisting member connecting said lower chord with an upper portion of the grain bin section at a point spaced from said connection of the first brace means whereby said trusses resist stresses tending to twist the grain bin supporting section, a motor support comprising a rearward extension of said lateral truss, and truss means connecting said motor support with the opposite end of the axle.

8. A combine harvester frame including an axle, wheels supporting the ends of the axle, a separator carrying section mounted on the axle, a grain bin supporting section extending above the separator section for carrying a grain bin above the separator section, a draft tongue including a truss having a lower chord connected with one end of the axle and an upper chord having connection with the grain bin section at a point spaced above the axle, a lateral truss including said upper chord and an outer chord spaced outwardly therefrom, means connecting the respective chords, brace means connecting the outer chord of the lateral truss with the grain bin section at a point above the connection of said upper chord, a torsion resisting member connecting said lower chord with an upper portion of the grain bin section at a point spaced from said connection of the first brace means whereby said trusses resist stresses tending to twist the grain bin supporting section, a motor support comprising a rearward extension of said lateral truss, truss means connecting said motor support with the opposite end of the axle, and a truss connecting the grain bin section with said other end of the axle to cooperate with the last named truss means in maintaining rigidity of said axle relatively to the draft tongue.

9. A combine harvester frame including an axle, wheels supporting the ends of the axle, a grain bin supporting section including uprights having supporting connection with the axle and extending upwardly therefrom to carry a grain bin, a draft tongue including a truss having a chord connected with the axle and an upper chord having connection with one of the uprights at a point spaced above the axle, a lateral truss connected with the first named truss, braces connecting the trusses, and brace means connecting the lateral truss with the grain bin section at a point above the connection of said upper chord.

10. A combine harvester frame including an axle, wheels supporting the ends of the axle, a grain bin supporting section including uprights having supporting connection with the axle and extending upwardly therefrom to carry a grain bin, a draft tongue including a truss having a lower chord connected with the axle, an upper chord having connection with one of said uprights at a point spaced above the axle, a lateral truss connected with the first named truss, means connecting chords of the respective trusses, brace means connecting the lateral truss with said upright at a point above the connection of said upper chord, and a truss connecting the upper portion of the grain bin section with the opposite end of the axle.

11. A combine harvester frame including an axle, wheels supporting the ends of the axle, a separator carrying section mounted on the axle, a grain bin supporting section including uprights having connecting support on said axle for carrying a grain bin in towering position with respect to said axle, a draft tongue including a truss having a lower chord connected with one end of the axle and an upper chord having connection with one of said uprights at a point spaced above the axle, a lateral truss connected with the first named truss, a brace member connecting the lateral truss with said upright at a point above the connection of said upper chord, and a torsion resisting member connecting said lower chord with another of said uprights whereby said brace and torsion resisting members cooperate with said trusses to resist torsional stresses tending to twist the grain bin supporting section.

12. A combine harvester frame including an axle, wheels supporting the ends of the axle, a separator carrying section mounted on the axle, a grain bin supporting section including uprights having connecting support on said axle for carrying a grain bin in towering position with respect to said axle, a draft tongue including a truss having a lower chord connected with one end of the axle and an upper chord having connection with one of said uprights at a point spaced above the axle, a lateral truss connected with the first named truss, a brace member connecting the lateral truss with said upright at a point above the connection of said upper chord, a torsion resisting member connecting said lower chord with another of said uprights whereby said brace and torsion resisting members cooperate with said trusses to resist torsional stresses tending to twist the grain bin supporting section, and a diagonal truss extending across the upper portion of said grain bin section and having connection with the opposite end of the axle.

TORVALD N. PIERSON.